United States Patent
Li et al.

(10) Patent No.: US 11,134,497 B2
(45) Date of Patent: Sep. 28, 2021

(54) SIGNAL TRANSMISSION METHOD AND APPARATUS

(71) Applicant: HUAWEI TECHNOLOGIES CO., LTD., Shenzhen (CN)

(72) Inventors: Junchao Li, Shanghai (CN); Javad Abdoli, Ottawa (CA); Hao Tang, Shanghai (CN); Fan Wang, Shanghai (CN); Zhenfei Tang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 113 days.

(21) Appl. No.: 16/579,844

(22) Filed: Sep. 24, 2019

(65) Prior Publication Data
US 2020/0022131 A1 Jan. 16, 2020

Related U.S. Application Data (63) Continuation of application No. PCT/CN2018/079717, filed on Mar. 21, 2018.

(30) Foreign Application Priority Data

Mar. 24, 2017 (CN) .......................... 201710184682.X (51) Int. Cl.
*H04W 8/24* (2009.01)
*H04W 72/04* (2009.01)
*H04W 88/06* (2009.01)

(52) U.S. Cl.
CPC ........... *H04W 72/048* (2013.01); *H04W 8/24* (2013.01); *H04W 72/042* (2013.01); *H04W 72/0453* (2013.01); *H04W 88/06* (2013.01)

(58) Field of Classification Search
CPC ... H04W 72/048; H04W 8/24; H04W 72/042; H04W 72/0453; H04W 88/06; H04W 28/20; H04W 8/22; H04W 72/0413
See application file for complete search history.

(56) References Cited

U.S. PATENT DOCUMENTS 9,338,695 B2 * 5/2016 Kitazoe ................... H04L 5/001
10,389,503 B2 * 8/2019 Soriaga ................ H04B 7/0452
(Continued)

FOREIGN PATENT DOCUMENTS

| CN | 101064634 A | 10/2007 |
|---|---|---|
| CN | 101378579 A | 3/2009 |

(Continued)

OTHER PUBLICATIONS

Ericsson:"UE and basestation spectral confinement capabilities in NR", 3GPP Draft; R4-1700651, vol. RAN WG4, No. Athens, Greece; Feb. 13, 2017-Feb. 17, 2017, Feb. 12, 2017, XP051213806, 6 pages.
(Continued)

*Primary Examiner* — Julio R Perez
(74) *Attorney, Agent, or Firm* — Hauptman Ham, LLP (57) ABSTRACT

Various embodiments provide a signal transmission method and apparatus, and is applied to a multi-band communications system. Under the method, a terminal reports bandwidth capability information of a first frequency band in a plurality of frequency bands to a radio access network node. An operating band of the terminal includes the first frequency band, the bandwidth capability information of the first frequency band indicates a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band. The terminal can send or receive a signal on a resource allocated by the radio access network node based on the bandwidth capability information.

20 Claims, 5 Drawing Sheets

(56) References Cited

U.S. PATENT DOCUMENTS

| | | | |
|---|---|---|---|
| 10,945,293 B2* | 3/2021 | Lei | H04B 1/713 |
| 2010/0195586 A1* | 8/2010 | Choi | H04W 72/042 |
| | | | 370/329 |
| 2012/0122409 A1* | 5/2012 | Ode | H04W 72/0406 |
| | | | 455/71 |
| 2012/0243455 A1* | 9/2012 | Feng | H04L 5/0037 |
| | | | 370/311 |
| 2013/0114508 A1* | 5/2013 | Liang | H04L 5/0091 |
| | | | 370/328 |
| 2015/0327269 A1* | 11/2015 | Kim | H04W 74/004 |
| | | | 370/329 |
| 2015/0365945 A1 | 12/2015 | Morioka et al. | |
| 2019/0297659 A1* | 9/2019 | Huang | H04W 72/0486 |
| 2020/0344819 A1* | 10/2020 | Myung | H04W 74/0808 |
| 2021/0041397 A1* | 2/2021 | Hall | G01N 33/46 |
| 2021/0051592 A1* | 2/2021 | Wang | H04L 5/001 |
| 2021/0051653 A1* | 2/2021 | Park | H04W 72/0413 |
| 2021/0052246 A1* | 2/2021 | King | A61B 8/04 |

FOREIGN PATENT DOCUMENTS

| | | |
|---|---|---|
| CN | 105813202 A | 7/2016 |
| JP | 4832443 B2 | 12/2011 |

OTHER PUBLICATIONS

Qualcomm,"[DRAFT] LS on Wideband Operating Options", 3GPP TSG-RAN WG1 Meeting #88 R1-1703919,Athens, Greece, Feb. 13-17, 2017,total 1 page.

3rd Generation Partnership Project; Technical Specification Group Radio Access Network; Study on New Radio Access Technology; RF and co-existence aspects (Release 14), 3GPP TR38 .803, vol. RAN WG4, No. V2.0.0, Mar. 6, 2017, pp. 1-192, XP051290396.

"RAN1 Chairman's Notes", 3GPP TSG RAN WG1 Meeting #88,Athens, Greece Feb. 13-17, 2017,total 109 pages.

India Examination Report issued in corresponding India Application No. 201937031397, dated Mar. 15, 2021, pp. 1-5, Intellectual Property Office of India, Kolkata, India.

* cited by examiner

SIGNAL TRANSMISSION METHOD AND APPARATUS

CROSS-REFERENCE TO RELATED APPLICATIONS

This application is a continuation of International Application No. PCT/CN2018/079717, filed on Mar. 21, 2018, which claims priority to Chinese Patent Application No. 201710184682.X, filed on Mar. 24, 2017. The disclosures of the aforementioned applications are hereby incorporated by reference in their entireties.

TECHNICAL FIELD

This application relates to the field of communications technologies, and in particular, to a signal transmission method and apparatus.

BACKGROUND

Currently, extensive research on a 5th generation (5th generation, 5G) communications system is being carried out. The 5th generation communications system uses a new radio access technology (New Radio access technology, NR), and can support communication in a plurality of frequency bands (for example, a frequency band less than 3 GHz, a frequency band from 3 GHz to 6 GHz, and a frequency band greater than 6 GHz). An existing bandwidth capability design cannot meet a requirement of a multi-band communications system.

SUMMARY

In view of this, various embodiments provide a signal transmission method and apparatus, so as to improve resource configuration flexibility in a multi-band communications system.

According to a first aspect, this application provides a signal transmission method, and the method is applied to a multi-band communications system. The method includes: reporting, by a terminal, bandwidth capability information of a first frequency band in a plurality of frequency bands to a radio access network node; allocating, by a base station, a resource to the terminal based on the bandwidth capability information; and sending or receiving, by the base station and the terminal, a signal on the allocated resource. An operating band of the terminal includes the first frequency band, the bandwidth capability information of the first frequency band is used to indicate a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band.

According to a second aspect, this application provides a signal transmission method, and the method is applied to a multi-band communications system. The method includes: receiving, by a radio access network node, bandwidth capability information that is of a first frequency band in a plurality of frequency bands and that is reported by a terminal; allocating, by the radio access network node, a resource based on the bandwidth capability information; and sending or receiving, by the radio access network node, a signal on the allocated resource. An operating band of the terminal includes the first frequency band, the bandwidth capability information of the first frequency band is used to indicate a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band.

According to a third aspect, this application provides a signal transmission apparatus, including a unit or a means (means) used to perform steps in the first aspect.

According to a fourth aspect, this application provides a signal transmission apparatus, including a unit or a means used to perform steps in the second aspect.

According to a fifth aspect, this application provides a signal transmission apparatus, including at least one processing element and at least one storage element. The at least one storage element is configured to store a program and data, and the at least one processing element is configured to perform the method provided in the first aspect or the second aspect of this application.

According to a sixth aspect, this application provides a signal transmission apparatus, including at least one processing element (or chip) configured to perform the method in the first aspect or the second aspect.

According to a seventh aspect, this application provides a signal transmission program. When being executed by a processor, the program is configured to perform the method in the first aspect or the second aspect.

According to an eighth aspect, a program product is provided, for example, a computer readable storage medium. The program product includes the program in the seventh aspect.

It can be learned that, in the foregoing aspects, a minimum threshold is designed for the bandwidth capability of the terminal, and it is stipulated that the minimum threshold is determined based on the maximum bandwidth capability of the terminal, the first frequency band, or the subcarrier spacing of the first frequency band, so that the radio access network node may allocate resources based on different bandwidth capabilities reported by the terminal, and transmit a signal, thereby improving resource configuration flexibility.

In the foregoing aspects, the first threshold is determined based on the maximum bandwidth capability of the terminal, and the maximum bandwidth capability is a smaller value of a radio frequency bandwidth capability and a baseband bandwidth capability of the terminal. The baseband bandwidth capability is a product of the subcarrier spacing of the first frequency band and a maximum quantity of FFT points used by the terminal. Alternatively, the baseband bandwidth capability is a product of the subcarrier spacing of the first frequency band and a quantity of collection points used by the terminal. The first threshold is less than or equal to a smaller value of the product and the radio frequency bandwidth capability of the terminal. Determining the first threshold is associated with the maximum quantity of FFT points or collection points of the terminal, and with subcarrier spacings of each frequency band, thereby improving resource configuration flexibility, and reducing design complexity. In addition, the maximum bandwidth capability is defined as the smaller value of the radio frequency bandwidth capability and the baseband bandwidth capability, and the first threshold is set to be less than or equal to the smaller value, thereby ensuring signal transmission reliability.

In the foregoing aspects, the first threshold is determined based on the first frequency band, synchronization signal blocks corresponding to different frequency bands in the plurality of frequency bands are of different frequency domain widths, and the different frequency bands in the plurality of frequency bands correspond to different first thresholds. The first threshold corresponding to the first frequency band is greater than or equal to a frequency domain width of a synchronization signal block corresponding to the first frequency band. The first thresholds corresponding to the different frequency bands are set to be different and greater than or equal to the corresponding frequency domain widths. Therefore, it is ensured that the terminal can receive the entire synchronization signal block in the different frequency bands, thereby ensuring signal transmission reliability, and reducing design complexity.

In the foregoing aspects, the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds. The first threshold corresponding to the first frequency band is greater than or equal to a frequency domain width of a synchronization signal block corresponding to the first frequency band. The first thresholds corresponding to the different subcarrier spacings are set to be different and greater than or equal to the corresponding frequency domain widths. Therefore, it is ensured that the terminal can receive the entire synchronization signal block in the different frequency bands, thereby ensuring signal transmission reliability, and reducing design complexity.

In the foregoing aspects, the bandwidth capability information of the first frequency band is used to indicate a downlink bandwidth capability or an uplink bandwidth capability of the terminal in the first frequency band.

In the foregoing aspects, the first threshold is not greater than a minimum value of maximum bandwidths of the terminal in all frequency bands. Such a solution helps reduce design complexity.

In the foregoing aspects, the first threshold is not greater than a minimum value of maximum bandwidths of the terminal at all subcarrier spacings of a given frequency band. Different frequency bands have different first thresholds, thereby improving resource configuration flexibility.

In the foregoing aspects, the bandwidth capability of the terminal is less than a system bandwidth in some of the plurality of frequency bands. Further, the bandwidth capability of the terminal is less than or equal to the maximum bandwidth capability of the terminal.

In the first aspect, the bandwidth capability information of the first frequency band is used to indicate a downlink bandwidth capability of the terminal in the first frequency band, and the sending or receiving, by the terminal, a signal on a resource allocated by the radio access network node based on the bandwidth capability information includes: receiving, by the terminal, a downlink signal on the resource allocated by the radio access network node based on the bandwidth capability information. The method in the first aspect further includes: reporting, by the terminal, second bandwidth capability information of the first frequency band in the plurality of frequency bands to the radio access network node, where the second bandwidth capability information is used to indicate an uplink bandwidth capability of the terminal in the first frequency band, the uplink bandwidth capability in the first frequency band is not less than a second threshold, and the second threshold is determined based on the maximum bandwidth capability of the terminal, the first frequency band, or the subcarrier spacing of the first frequency band; and sending, by the terminal, an uplink signal on a resource allocated by the radio access network node based on the second bandwidth capability information. The second threshold is less than or equal to the first threshold.

In the second aspect, the bandwidth capability information of the first frequency band is used to indicate a downlink bandwidth capability of the terminal in the first frequency band, and the sending or receiving, by the radio access network node, a signal on the allocated resource includes: receiving, by the radio access network node, a downlink signal on the allocated resource. The method in the second aspect further includes: receiving, by the radio access network node, second bandwidth capability information that is of the first frequency band in the plurality of frequency bands and that is reported by the terminal, where the second bandwidth capability information is used to indicate an uplink bandwidth capability of the terminal in the first frequency band, the uplink bandwidth capability in the first frequency band is not less than a second threshold, and the second threshold is determined based on the maximum bandwidth capability of the terminal, the first frequency band, or the subcarrier spacing of the first frequency band; and sending, by the radio access network node, an uplink signal on a resource allocated based on the second bandwidth capability information. The second threshold is less than or equal to the first threshold.

A minimum threshold of the uplink bandwidth capability may be defined without considering impact imposed on receiving an entire synchronization signal block, and a definition of the minimum threshold of the uplink bandwidth capability is independent of a definition of a minimum threshold of the downlink bandwidth capability, thereby reducing design complexity.

DESCRIPTION OF EMBODIMENTS

The following explains some terms in this application, to facilitate understanding of a person skilled in the art.

(1). A terminal (Terminal) is also referred to as user equipment (User Equipment, UE), a mobile station (mobile station, MS), a mobile terminal (mobile terminal, MT), or the like, and is a device that provides a user with voice and/or data connectivity, for example, a handheld device or a vehicle-mounted device with a wireless connection function. Currently, some examples of the terminals are: a mobile phone (mobile phone), a tablet computer (Pad), a notebook computer, a palmtop computer, a mobile internet device (Mobile Internet Device, MID), a wearable device such as a smartwatch, a smart band, or a pedometer, a computer with a wireless receiving and sending function, a virtual reality (virtual reality, VR) terminal device, an augmented reality (augmented reality, AR) terminal device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), and a wireless terminal in a smart home (smart home).

(2). A radio access network (Radio Access Network, RAN) is a network part in which a terminal accesses a wireless network. A RAN node or device is a node or device in the radio access network, and may also be referred to as a base station. Currently, some examples of the RAN nodes are: a gNB, a transmission/reception point (Transmission Reception Point, TRP), an evolved NodeB (evolved Node B, eNB), a radio network controller (Radio Network Controller, RNC), a NodeB (Node B, NB), a base station controller (Base Station Controller, BSC), a base transceiver station (Base Transceiver Station, BTS), a home eNodeB (for example, Home evolved NodeB or Home Node B, HNB), a baseband unit (BaseBand Unit, BBU), or a Wi-Fi access point (Access Point, AP). In addition, in a network structure, the RAN may include a centralized unit (Centralized Unit, CU) node and a distributed unit (Distributed Unit, DU) node. In this structure, a protocol layer of the eNB in long term evolution (Long Term Evolution, LTE) is split. Some functions of the protocol layer are controlled by the CU in a centralized manner, some or all of the remaining functions of the protocol layer are distributed in the DUs, and the CU controls the DUs in a centralized manner. The various embodiments impose no limitation on a specific technology and a specific device form used by a radio access network device.

(3). "A plurality of" means two or more, and other quantifiers are similar to this. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

(4). A system bandwidth is also referred to as a maximum carrier bandwidth, and is a maximum channel bandwidth per carrier (maximum channel bandwidth per carrier).

It should be understood that technical solutions of the various embodiments may be applied to various communications systems, for example, an LTE system, an LTE frequency division duplex (frequency division duplex, FDD) system, LTE time division duplex (time division duplex, TDD), a 4.5th generation (4.5th generation, 4.5G) network, a 5G network, and NR.

In the long term evolution (long term evolution, LTE) system, the system operates in a single frequency band less than 3 GHz. In the frequency band, a system bandwidth is 20 MHz, and a minimum value of a bandwidth capability supported by the terminal is defined as 20 MHz, which is the same as the system bandwidth. In this way, in the LTE system, for a given frequency band, none of minimum values of bandwidth capabilities supported by all terminals is less than the system bandwidth. Therefore, the RAN node voluntarily decides to operate in a system bandwidth from 1.44M to 20M without a need of learning the bandwidth capability of the terminal.

In a multi-band communications system, the terminal may support different bandwidths in different frequency bands. Consequently, if a uniform minimum value of the bandwidth capability is still defined for the terminal for different frequency bands, resource configuration flexibility may be reduced, or design complexity may be increased. For example, in the NR system, the system bandwidth may be 400 MHz, and the bandwidth supported by the terminal may be greater than or equal to 100 MHz, or may be less than 100 MHz. In other words, the system bandwidth may be greater than the bandwidth supported by the terminal. In this case, the minimum value of the bandwidth capability of the terminal is defined for different frequency bands or different terminals in the various embodiments, and the terminal may report, to the RAN node, a bandwidth capability within a constraint of the minimum value, so that the RAN node may allocate a resource based on the bandwidth capability reported by the terminal, thereby improving the resource configuration flexibility. For example, in the various embodiments, the terminal may report the bandwidth capability to the RAN node. In addition, the bandwidth capability is within a constraint of a threshold, and the threshold may be determined based on a maximum bandwidth capability of the terminal, a first frequency band, or a subcarrier spacing of the first frequency band. In this way, the terminal may report, to the RAN node, the bandwidth capability that meets the foregoing threshold, so that the RAN node may allocate the resource based on the bandwidth capability reported by the terminal, thereby improving the resource configuration flexibility.

The following describes example technical solutions in accordance with the disclosure with reference to accompanying drawings.

Figure 1:
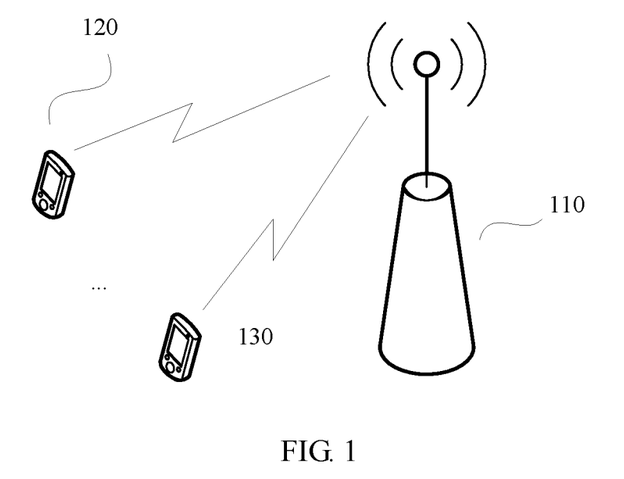
FIG. 1 is a diagram of a schematic system architecture of a communications system according to one embodiment.

FIG. 1 is a diagram of a schematic system architecture of a communications system 100 according to one embodiment.

As shown in FIG. 1, the mobile communications system includes a RAN node (a base station 110 in FIG. 1) and at least one terminal (a terminal 120 and a terminal 130 in FIG. 1). The terminals are connected to the RAN node in a wireless manner. The RAN node may be connected to a core network device (not shown in FIG. 1) in a wireless or wired manner. The core network device and the RAN node may be different independent physical devices. Alternatively, functions of the core network device and logical functions of the RAN node may be integrated into a same physical device, or some functions of the core network device and some functions of the RAN node may be integrated into one physical device. The terminal may be fixed, or may be removable.

The RAN node and the terminal may be deployed on land, including indoor or outdoor devices, handheld devices, or vehicle-mounted devices; or may be deployed on the water; or may be deployed on an airplane, a balloon, or a satellite in the sky. This embodiment of this application imposes no limitation on application scenarios of the RAN node and the terminal.

In this embodiment, the communications system is a multi-band communications system, and can support communication in a plurality of frequency bands (for example, a frequency band less than 3 GHz, a frequency band from 3 GHz to 6 GHz, and a frequency band greater than 6 GHz).

It should be understood that FIG. 1 is only a schematic diagram. The communications system may further include other network devices, for example, a wireless relay node and a wireless backhaul device (not shown in FIG. 1). This embodiment of this application imposes no limitation on quantities of core network devices, RAN nodes, and terminals included in the mobile communications system.

Figure 2:
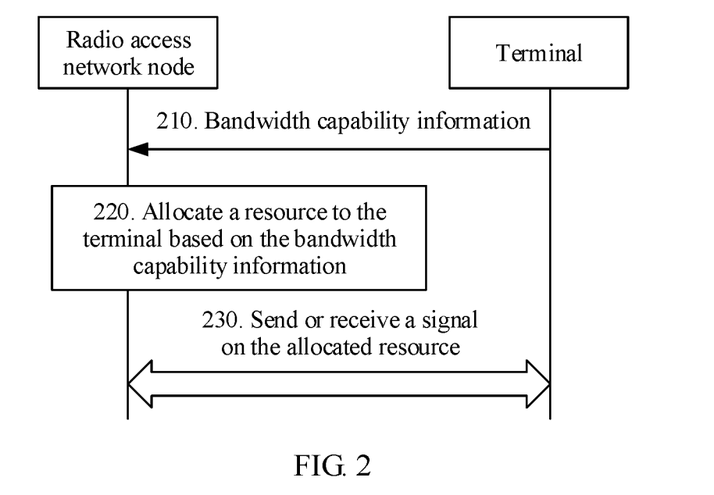
FIG. 2 is a schematic flowchart of a signal transmission method according to one embodiment.

FIG. 2 is a schematic flowchart of a signal transmission method according to one embodiment. The method is applied to a multi-band communications system. The method may be performed by the RAN node or the terminal in FIG. 1. The method in FIG. 2 includes the following content.

Step 210: The terminal reports bandwidth capability information of a first frequency band in a plurality of frequency bands to the RAN node, where an operating band of the terminal includes the first frequency band, the bandwidth capability information of the first frequency band is used to indicate a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band.

Herein, the first frequency band may be any one of the plurality of frequency bands. Each of the plurality of frequency bands may include at least one subcarrier spacing. For a data signal, different frequency bands may include a same subcarrier spacing or different subcarrier spacings. For example, a frequency band less than 3 GHz may include two subcarrier spacings of 15 kHz and 30 kHz, and a frequency band from 3 GHz to 6 GHz may include two subcarrier spacings of 30 kHz and 60 kHz. For a synchronization signal block, different subcarrier spacings may be used for different frequency bands. For example, a subcarrier spacing of 30 kHz may be used for a frequency band less than 3 GHz, and a subcarrier spacing of 60 kHz may be used for a frequency band from 3 GHz to 6 GHz.

The maximum bandwidth capability of the terminal is a maximum bandwidth that can be theoretically provided by the terminal. For example, the maximum bandwidth capability may be a smaller value of a radio frequency bandwidth capability (a maximum radio frequency bandwidth) and a baseband bandwidth capability (a maximum baseband bandwidth). Further, the bandwidth capability of the terminal in the first frequency band is also referred to as a bandwidth supported by the terminal in the first frequency band, or is referred to as an actual maximum bandwidth. The actual maximum bandwidth may be set to be not less than the first threshold. The first threshold may be a minimum value of a bandwidth supported by the terminal.

In addition, the bandwidth capability information that is of the first frequency band and that is reported by the terminal is less than or equal to the maximum bandwidth capability of the terminal. In other words, bandwidth capability information that is of any operating band and that is actually reported by the terminal is less than or equal to the maximum bandwidth that can be provided by the terminal.

Step 220: The RAN node may allocate a resource based on the bandwidth capability information reported by the terminal.

Specifically, the RAN node may allocate the resource according to a preset rule and based on the bandwidth capability information reported by the terminal. For example, the RAN node may allocate the resource to the terminal based on at least one of a system bandwidth and a network state (such as a throughput, load, or congestion), and the bandwidth capability information reported by the terminal. A resource allocation manner is not limited in this embodiment. For example, the resource may be alternatively allocated according to an instruction of high layer signaling and based on the bandwidth capability reported by the terminal.

The RAN node may allocate a bandwidth part resource of the entire system bandwidth to the terminal; or the RAN node may divide the system bandwidth into subbands, and allocate a bandwidth resource in a subband to the terminal.

Step 230: The RAN node and the terminal send or receive a signal on the allocated resource.

When the RAN node allocates a downlink resource to the terminal, the RAN node sends a signal on the allocated resource, and the terminal receives the signal. When the RAN node allocates an uplink resource to the terminal, the terminal sends a signal on the allocated resource, and the RAN node receives the signal.

In the multi-band communications system, bandwidth capabilities supported by the terminal in some frequency bands may be less than the system bandwidth, and bandwidth capabilities supported by the terminal in other frequency bands may be greater than the system bandwidth. In this case, when the terminal is designed, it is no longer suitable to set a uniform threshold for minimum values of bandwidth capabilities supported by the terminal, and a bandwidth capability of the terminal in a specific frequency band may be set to be not less than a specific minimum value (the first threshold).

According to this embodiment, the first threshold may be determined based on the maximum bandwidth capability of the terminal. Because the terminal has different maximum bandwidth capabilities, a bandwidth capability sent by the terminal to the RAN node may be flexibly determined between the first threshold and the maximum bandwidth capability according to an actual requirement.

In another embodiment, the first threshold may be determined based on the first frequency band or the subcarrier spacing of the first frequency band. For example, different first thresholds may be designed for the terminal for different frequency bands, or different first thresholds may be designed for the terminal for different subcarrier spacings of frequency bands. For example, different frequency bands may have different subcarrier spacings, and for the different subcarrier spacings, the first thresholds may be defined as values corresponding to the different subcarrier spacings. For example, the first frequency band has a first subcarrier spacing, and a second frequency band has a second subcarrier spacing. In this way, a first threshold corresponding to the first subcarrier spacing of the first frequency band may be different from a first threshold corresponding to the second subcarrier spacing.

Further, when the RAN node communicates with the terminal, the RAN node may receive the bandwidth capability information reported by the terminal, allocate the resource to the terminal based on the bandwidth capability of the terminal that is indicated by the bandwidth capability information of the terminal, and communicate with the terminal on the allocated resource. For example, when the RAN node performs resource configuration, a bandwidth requirement of the terminal device needs to be met.

According to this embodiment, a minimum threshold is designed for the bandwidth capability of the terminal, and it is stipulated that the minimum threshold is determined based on the maximum bandwidth capability of the terminal, the first frequency band, or the subcarrier spacing of the first frequency band, so that the RAN node may allocate resources based on different bandwidth capabilities reported by the terminal, and transmit a signal, thereby improving resource configuration flexibility.

According to this embodiment, the first threshold is determined based on the maximum bandwidth capability of the terminal, and the maximum bandwidth capability may be determined based on the radio frequency bandwidth capability (the maximum radio frequency bandwidth) and the baseband bandwidth capability (the maximum baseband bandwidth) that are supported by the terminal. For example, the maximum bandwidth capability is the smaller value of the radio frequency bandwidth capability and the baseband bandwidth capability of the terminal. The baseband bandwidth capability is a product of the subcarrier spacing of the first frequency band and a maximum quantity of FFT points used by the terminal. In some embodiments, the baseband bandwidth capability may be a product of the subcarrier spacing of the first frequency band and a maximum quantity of collection points used by the terminal. The first threshold is less than or equal to a smaller value of the product and the radio frequency bandwidth capability of the terminal. For example, the system bandwidth is 200 MHz, the radio frequency bandwidth capability of the terminal is also 200 MHz, and the baseband bandwidth capability of the terminal may be 100 MHz. In this case, a minimum bandwidth capability of the terminal is 100 MHz, and the first threshold may be set to be less than or equal to 100 MHz, for example, 80 MHz.

According to this embodiment, determining the first threshold is associated with the maximum quantity of FFT points or collection points of the terminal, and with subcarrier spacings of each frequency band, thereby improving resource configuration flexibility, and reducing design complexity. In addition, the maximum bandwidth capability is defined as the smaller value of the radio frequency bandwidth capability and the baseband bandwidth capability, and the first threshold is set to be less than or equal to the smaller value, thereby ensuring signal transmission reliability.

According to this embodiment, the first threshold is determined based on the first frequency band, synchronization signal blocks corresponding to different frequency bands in the plurality of frequency bands are of different frequency domain widths, and the different frequency bands in the plurality of frequency bands correspond to different first thresholds.

In an NR system, the synchronization signal block (SS block) may be a time-frequency resource block, and a synchronization signal may further include a master information block (MIB) in addition to a primary synchronization signal (primary SS) and/or a secondary synchronization signal (secondary SS). During time synchronization (time synchronization), transmission may be performed by using the SS block as a minimum unit. When a specific SS block is detected, time synchronization information may be learned.

In a multi-band scenario, synchronization signal blocks in different frequency bands may be of different frequency domain widths. For example, synchronization signal blocks with subcarrier spacings of 30 kHz, 120 kHz, and 240 kHz correspond to a frequency band less than 3 GHz, a frequency band from 3 GHz to 6 GHz, and a frequency band greater than 6 GHz respectively, and corresponding frequency domain widths are 10 MHz, 40 MHz, and 80 MHz. The frequency domain width is also referred to as a transmission bandwidth.

According to this embodiment, the first threshold corresponding to the first frequency band is greater than or equal to a frequency domain width of a synchronization signal block corresponding to the first frequency band. In some embodiments, for different frequency bands or subcarrier spacings, different maximum quantities of FFT points may be designed for the terminal, and consequently the baseband bandwidth capability of the terminal is affected. In this case, the first threshold may also be determined based on the minimum bandwidth capability of the terminal.

For example, when the first frequency band is a frequency band less than 3 GHz, the frequency domain width of the synchronization signal block may be 10 MHz. Therefore, the first threshold may be set to be greater than or equal to 10 MHz. When the first frequency band is a frequency band from 3 GHz to 6 GHz, the frequency domain width of the synchronization signal may be 40 MHz. Therefore, the first threshold may be set to be greater than or equal to 40 MHz. When the first frequency band is a frequency band greater than 6 GHz, the frequency domain width of the synchronization signal may be 80 MHz. Therefore, the first threshold may be set to be greater than or equal to 80 MHz.

According to this embodiment, the first thresholds corresponding to the different frequency bands are set to be different and greater than or equal to the corresponding frequency domain widths. Therefore, it is ensured that the terminal can receive the entire synchronization signal block in the different frequency bands, thereby ensuring signal transmission reliability, and reducing design complexity.

According to this embodiment, the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds. The first threshold corresponding to the first frequency band is greater than or equal to a frequency domain width of a synchronization signal block corresponding to the first frequency band.

For example, when the first frequency band is a frequency band less than 3 GHz, the subcarrier spacing is 30 kHz, and the frequency domain width of the synchronization signal block may be 10 MHz. Therefore, the first threshold may be set to be greater than or equal to 10 MHz. When the first frequency band is a frequency band from 3 GHz to 6 GHz, the subcarrier spacing is 120 kHz, and the frequency domain width of the synchronization signal may be 40 MHz. Therefore, the first threshold may be set to be greater than or equal to 40 MHz. When the first frequency band is a frequency band greater than 6 GHz, the subcarrier spacing is 240 kHz, and the frequency domain width of the synchronization signal may be 80 MHz. Therefore, the first threshold may be set to be greater than or equal to 80 MHz.

The first thresholds corresponding to the different subcarrier spacings are set to be different and greater than or equal to the corresponding frequency domain widths. Therefore, it is ensured that the terminal can receive the entire synchronization signal block in the different frequency bands, thereby ensuring signal transmission reliability, and reducing design complexity.

It should be understood that values of the frequency band, the subcarrier spacing, and the frequency domain width are merely examples. In different system scenarios, the frequency band, the subcarrier spacing, and the frequency domain width may be other values.

According to this embodiment, the bandwidth capability information of the first frequency band is used to indicate a downlink bandwidth capability or an uplink bandwidth capability of the terminal in the first frequency band. In other words, the foregoing solution is applicable to both uplink signal transmission and downlink signal transmission.

According to this embodiment, the bandwidth capability information of the first frequency band is used to indicate a downlink bandwidth capability of the terminal in the first frequency band, and the sending or receiving, by the terminal, a signal on a resource allocated by a network side device based on the bandwidth capability information includes: receiving, by the terminal, a downlink signal on the resource allocated by the network side device based on the bandwidth capability information. The method further includes: reporting, by the terminal, second bandwidth capability information of the first frequency band in the plurality of frequency bands to the RAN node, where the second bandwidth capability information is used to indicate an uplink bandwidth capability of the terminal in the first frequency band, the uplink bandwidth capability in the first frequency band is not less than a second threshold, and the second threshold is determined based on the maximum bandwidth capability of the terminal, the first frequency band, or the subcarrier spacing of the first frequency band; and sending, by the terminal, an uplink signal on a resource allocated by the network side device based on the second bandwidth capability information. The second threshold is less than or equal to the first threshold.

A minimum threshold of the uplink bandwidth capability may be defined without considering impact imposed on receiving an entire synchronization signal block, and a definition of the minimum threshold of the uplink bandwidth capability is independent of a definition of a minimum threshold of the downlink bandwidth capability, thereby reducing design complexity.

It should be understood that the first bandwidth capability information and the second bandwidth capability information may be separately carried in different messages for reporting, or may be carried in a same message for reporting.

According to this embodiment, a difference between the first threshold and second threshold varies with a frequency band in the plurality of frequency bands. A minimum value of the uplink bandwidth capability may be different from a minimum value of the downlink bandwidth capability, so that an uplink bandwidth capability requirement of the terminal may be reduced, thereby reducing uplink radio frequency and baseband design complexity of the terminal.

Figure 3:
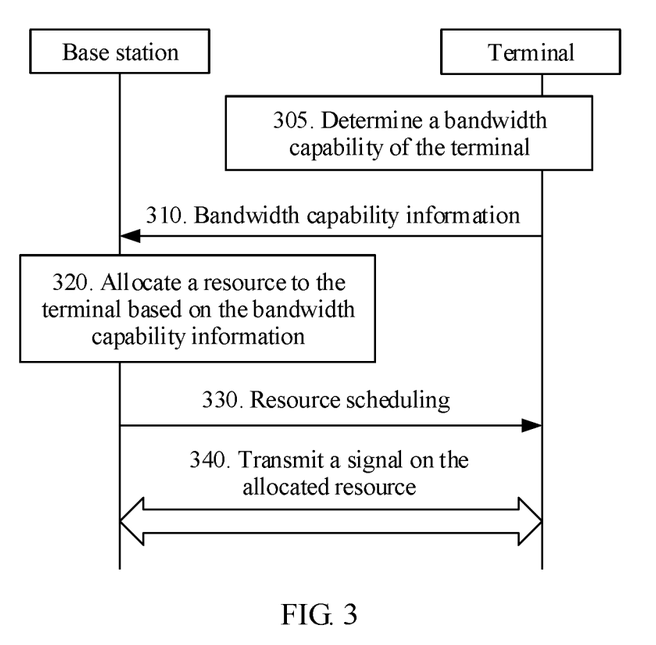
FIG. 3 is a schematic flowchart of a signal transmission process according to another embodiment of this application.

FIG. 3 is a schematic flowchart of a signal transmission process according to another embodiment of this application. FIG. 3 is an example of the method in FIG. 2. In this embodiment, an example in which a RAN node is a base station is used for description.

Step 305: A terminal determines bandwidth capability information of the terminal.

For example, the terminal may determine, based on a preset minimum value (the first threshold in the embodiment in FIG. 2) of a supported bandwidth capability, the bandwidth capability supported by the terminal. The bandwidth capability is not less than the first threshold and is not greater than a maximum bandwidth capability (which is a smaller value of a radio frequency bandwidth capability and a baseband bandwidth capability) of the terminal.

The bandwidth capability information of the terminal reported by the terminal may be an exact bandwidth value, or a number or an index used to indicate the bandwidth value. This embodiment of this application is not limited thereto. The bandwidth capability information may also include a radio frequency bandwidth and a quantity of FFT points. In this case, the base station may estimate the bandwidth capability of the terminal based on the quantity of FFT points and the radio frequency bandwidth that are reported by the terminal.

Further, the terminal may determine, based on any combination of state information of the terminal such as a service throughput requirement, a processing delay, and power consumption, the bandwidth capability that can be supported by the terminal. In this way, the bandwidth capability reported by the terminal may be less than the maximum bandwidth capability of the terminal; or the quantity of FFT points and the radio frequency bandwidth capability that are reported by the terminal are less than a maximum quantity of FFT points and a radio frequency bandwidth capability. For example, when the terminal needs to obtain a large throughput, the reported bandwidth capability may be close to the maximum bandwidth capability of the terminal. Alternatively, when the terminal requires a relatively low processing delay or relatively low power consumption, the bandwidth capability reported by the terminal may be relatively low.

The bandwidth capability of the terminal reported by the terminal may meet the following condition: first threshold≤bandwidth capability of the terminal≤min(radio frequency bandwidth capability of the terminal, product of a maximum quantity of FFT points and the subcarrier spacing). The product of the maximum quantity of FFT points and the subcarrier spacing is the baseband bandwidth capability of the terminal.

The following table is used as an example. Assuming that a maximum radio frequency bandwidth supported by the terminal is 200 MHz, and the maximum quantity of FFT points are 4096, the maximum bandwidth capability of the terminal at each SCS may be calculated according to the foregoing formula:

TABLE 1

| Frequency band | Subcarrier spacing (kHz) | Maximum bandwidth capability (MHz) |
| --- | --- | --- |
| <3 GHz | 15 | 61 |
|  | 30 | 122 |
| 3 GHz to 6 GHz | 30 | 122 |
|  | 60 | 200 |
| >6 GHz | 60 | 200 |
|  | 120 | 200 |
|  | 240 | 200 |

Referring to Table 1, a frequency band less than 3 GHz corresponds to subcarrier spacings of 15 kHz and 30 kHz, and corresponding maximum bandwidths are 61 MHz and 122 MHz; a frequency band from 3 GHz to 6 GHz corresponds to subcarrier spacings of 30 kHz and 60 kHz, and corresponding maximum bandwidths are 122 MHz and 200 MHz; and a frequency band greater than 6 GHz corresponds to subcarrier spacings of 60 kHz, 120 kHz, and 240 kHz, and corresponding maximum bandwidths are all 200 MHz.

The first threshold may be defined in at least two manners. An example is used below for description with reference to Table 1:

1. It may be stipulated that the first threshold is not greater than a minimum value of maximum bandwidths of the terminal in all possible frequency bands (or SCSs). The minimum value is a minimum value in a rightmost column in Table 1. In other words, the first threshold is not greater than 61 MHz.

2. It may be stipulated that the first threshold is not greater than a minimum value of maximum bandwidths of the terminal at all possible SCSs in a given frequency band. Referring to Table 1, when the terminal operates in the frequency band less than 3 GHz, the first threshold is not greater than 61 MHz; when the terminal operates in the frequency band from 3 GHz to 6 GHz, the first threshold is not greater than 122 MHz; or when the terminal operates in the frequency band greater than 6 GHz, the first threshold is not greater than 200 MHz.

Based on the foregoing definitions, a bandwidth of the terminal may be less than a frequency domain width of a synchronization signal block. The terminal usually receives a synchronization signal through interception and detection by a filter. Therefore, in this case, the synchronization signal is a frequency division multiplexing (Frequency Division Multiplexing, FDM) combination of a plurality of subsequences. A length of each subsequence is a predefined size, and several subcarriers are reserved between frequency domain resources for the subsequences, to serve as guard intervals. For a small-bandwidth user, the synchronization signal is detected by receiving one subsequence. For a large-bandwidth user, the synchronization signal is detected by receiving a plurality of subsequences. In addition, different frequency bands correspond to different frequency domain widths. Therefore, to receive the entire synchronization signal block to reduce design complexity, the first threshold may be further set to be greater than or equal to the frequency domain width of the synchronization signal block.

Certainly, as an alternative solution of the foregoing two definitions, the first threshold may be merely set to be greater than or equal to the frequency domain width of the synchronization signal block.

Step 310: The terminal reports the bandwidth capability information to the base station.

The terminal may report the bandwidth capability information through a physical uplink channel. For example, the terminal may report the bandwidth capability information of the terminal to the base station through the physical uplink channel such as a physical random access channel (Physical Random Access Channel, PRACH), a physical uplink control channel (Physical Uplink Control Channel, PUCCH), or a physical uplink shared channel (Physical Uplink Shared Channel, PUSCH).

The terminal may report the bandwidth capability to the base station in a plurality of manners in a random access process. For example, the terminal may report the bandwidth capability that may be carried in the following existing signaling messages:

1. The terminal may report the bandwidth capability during initial access. For example, the terminal may report the bandwidth capability by using or through a preamble (preamble). This is applicable to a case in which the terminal initiates a contention-based random access process or a non-contention-based random access process. A preamble sequence and/or a parameter set (for example, the subcarrier spacing) may be determined based on the bandwidth capability of the terminal. In this way, the preamble sequence and/or the parameter set may be used to indicate the bandwidth capability of the terminal.

2. The terminal reports the bandwidth capability by using a message 3 (Msg.3). This is applicable to a case in which the terminal initiates a non-contention-based random access process. The bandwidth capability information of the terminal is carried in the Msg.3.

It should be understood that this embodiment is not limited to the foregoing bandwidth capability reporting manners. For example, the terminal may alternatively report the bandwidth capability information by using a dedicated signaling message.

Step 320: The base station allocates a resource based on the bandwidth capability information reported by the terminal.

It is assumed that a system bandwidth is X, and that a bandwidth Y supported by the terminal is less than X. The base station may allocate the resource to the terminal based on the bandwidth capability of the terminal. For example, the base station allocates, to the terminal, a resource whose bandwidth Z is less than or equal to Y in the system bandwidth X.

Step 330: The base station performs resource scheduling based on the resource allocated to the terminal.

For example, the base station performs resource scheduling in a semi-persistent scheduling manner and a dynamic scheduling manner. A resource scheduling process in this embodiment is similar to a conventional resource scheduling process, and details are not described herein.

Step 340: The terminal and the base station transmit a signal based on the allocated resource.

A process of signal transmission between the terminal and the base station based on the allocated resource is similar to a conventional signal transmission process, and details are not described herein.

Figure 4:
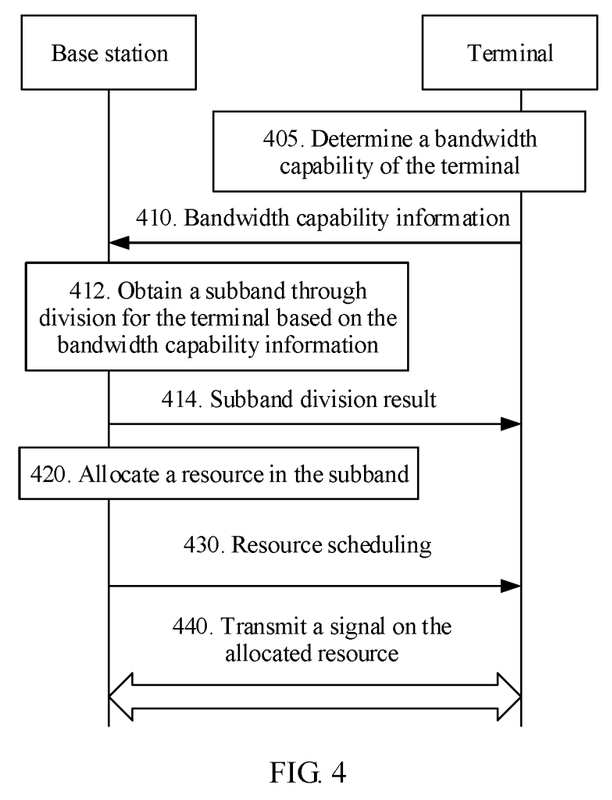
FIG. 4 is a schematic flowchart of a signal transmission process according to still another embodiment of this application.

FIG. 4 is a schematic flowchart of a signal transmission process according to still another embodiment of this application. In this embodiment, an example in which a RAN node is a base station is used for description.

Step 405: A terminal determines bandwidth capability information of the terminal. Step 405 is similar to step 305, and details are not described herein again.

Step 410: The terminal reports the bandwidth capability information to the base station. Step 410 is similar to step 310, and details are not described herein again.

Step 412: The base station obtains a subband through division for the terminal based on the bandwidth capability information reported by the terminal.

It is assumed that a system bandwidth is X, and that a bandwidth Y supported by the terminal is less than X. For the terminal, the base station divides the system bandwidth X, to obtain a subband whose bandwidth is Y.

Step 414: The base station notifies the terminal of a subband division result, where the subband division result is used to indicate the subband obtained through division for the terminal.

Step 420: The base station allocates a resource in the subband obtained through division for the terminal.

The base station may allocate, to the terminal, a resource whose bandwidth Z is less than or equal to Y in the subband.

Step 430: The base station performs resource scheduling based on the resource allocated to the terminal.

For example, the base station performs resource scheduling in a semi-persistent scheduling manner and a dynamic scheduling manner. A resource scheduling process in this embodiment is similar to a conventional resource scheduling process, and details are not described herein.

Step 440: The terminal and the base station transmit a signal based on the allocated resource.

A process of signal transmission between the terminal and the base station based on the allocated resource is similar to a conventional signal transmission process, and details are not described herein.

The foregoing describes the signal transmission method according to the various embodiments. The following describes a signal transmission apparatus according to various embodiments with reference to FIG. 5 to FIG. 8.

Figure 5:
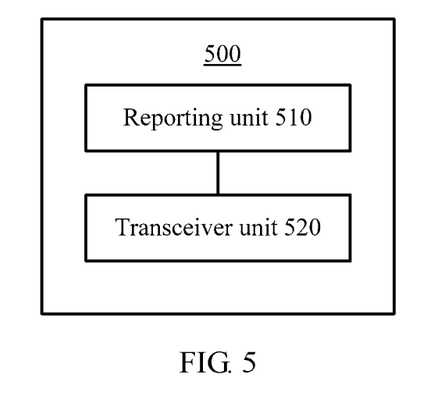
FIG. 5 is a schematic structural diagram of a signal transmission apparatus according to one embodiment.

FIG. 5 is a schematic structural diagram of a signal transmission apparatus 500 according to one embodiment.

The apparatus 500 is applied to a multi-band communications system, and the apparatus may be, for example, the terminal in FIG. 1. The apparatus 500 includes a reporting unit 510 and a transceiver unit 520.

The reporting unit 510 reports bandwidth capability information of a first frequency band in a plurality of frequency bands to a radio access network node, where an operating band of the terminal includes the first frequency band, the bandwidth capability information of the first frequency band is used to indicate a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band. The transceiver unit 520 sends or receives a signal on a resource allocated by the radio access network node based on the bandwidth capability information.

According to this embodiment, a minimum threshold is designed for the bandwidth capability of the terminal, and it is stipulated that the minimum threshold is determined based on the maximum bandwidth capability of the terminal, the first frequency band, or the subcarrier spacing of the first frequency band, so that the RAN node may allocate resources based on different bandwidth capabilities reported by the terminal, and transmit a signal, thereby improving resource configuration flexibility.

According to this embodiment, the first threshold is determined based on the maximum bandwidth capability of the terminal, and the maximum bandwidth capability is a smaller value of a radio frequency bandwidth capability and a baseband bandwidth capability of the terminal.

According to this embodiment, the baseband bandwidth capability is a product of the subcarrier spacing of the first frequency band and a maximum quantity of FFT points used by the terminal.

According to this embodiment, the first threshold is less than or equal to a smaller value of the product and the radio frequency bandwidth capability of the terminal.

According to this embodiment, the first threshold is determined based on the first frequency band, synchronization signal blocks corresponding to different frequency bands in the plurality of frequency bands are of different frequency domain widths, and the different frequency bands in the plurality of frequency bands correspond to different first thresholds.

According to this embodiment, the first threshold corresponding to the first frequency band is greater than or equal to a frequency domain width of a synchronization signal block corresponding to the first frequency band.

According to this embodiment, the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds.

According to this embodiment, the first threshold corresponding to the first frequency band is greater than or equal to a frequency domain width of a synchronization signal block corresponding to the first frequency band.

According to this embodiment, the bandwidth capability information of the first frequency band is used to indicate a downlink bandwidth capability or an uplink bandwidth capability of the terminal in the first frequency band.

In another embodiment, the bandwidth capability information of the first frequency band is used to indicate a downlink bandwidth capability of the terminal in the first frequency band; the transceiver unit 520 receives a downlink signal on the resource allocated by the radio access network node based on the bandwidth capability information; the reporting unit 510 further reports second bandwidth capability information of the first frequency band in the plurality of frequency bands to the radio access network node, where the second bandwidth capability information is used to indicate an uplink bandwidth capability of the terminal in the first frequency band, the uplink bandwidth capability in the first frequency band is not less than a second threshold, and the second threshold is determined based on the maximum bandwidth capability of the terminal, the first frequency band, or the subcarrier spacing of the first frequency band; and the transceiver unit 520 further sends an uplink signal on a resource allocated by the radio access network node based on the second bandwidth capability information.

According to this embodiment, the second threshold is less than or equal to the first threshold.

According to this embodiment, a difference between the first threshold and second threshold varies with a frequency band in the plurality of frequency bands.

For operations and functions of the units of the apparatus 500, refer to the method embodiment on a base station side corresponding to FIG. 2. To avoid repetition, details are not described herein again.

Figure 6:
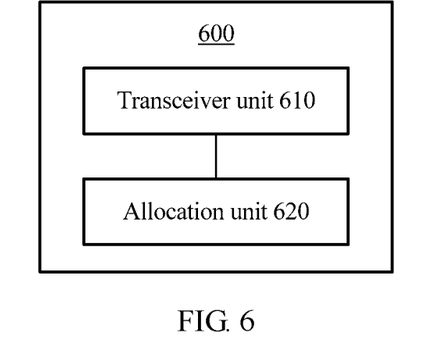
FIG. 6 is a schematic structural diagram of a signal transmission apparatus according to another embodiment of this application.

FIG. 6 is a schematic structural diagram of a signal transmission apparatus 600 according to another embodiment of this application. The apparatus 600 is applied to a multi-band communications system, and the apparatus may be, for example, the terminal in FIG. 1. The apparatus 600 includes a transceiver unit 610 and an allocation unit 620.

The transceiver unit 610 is configured to receive bandwidth capability information that is of a first frequency band in a plurality of frequency bands and that is reported by the terminal, where an operating band of the terminal includes the first frequency band, the bandwidth capability information of the first frequency band is used to indicate a bandwidth capability of the terminal in the first frequency band, the bandwidth capability in the first frequency band is not less than a first threshold, and the first threshold is determined based on a maximum bandwidth capability of the terminal, the first frequency band, or a subcarrier spacing of the first frequency band. The allocation unit 620 is configured to allocate a resource based on the bandwidth capability information. The transceiver unit 610 is further configured to send or receive a signal on the allocated resource.

According to this embodiment, a minimum threshold is designed for the bandwidth capability of the terminal, and it is stipulated that the minimum threshold is determined based on the maximum bandwidth capability of the terminal, the first frequency band, or the subcarrier spacing of the first frequency band, so that a RAN node may allocate resources based on different bandwidth capabilities reported by the terminal, and transmit a signal, thereby improving resource configuration flexibility.

According to this embodiment, the first threshold is determined based on the maximum bandwidth capability of the terminal, and the maximum bandwidth capability is a smaller value of a radio frequency bandwidth capability and a baseband bandwidth capability of the terminal.

According to this embodiment, the baseband bandwidth capability is a product of the subcarrier spacing of the first frequency band and a maximum quantity of FFT points used by the terminal.

According to this embodiment, the first threshold is less than or equal to a smaller value of the product and the radio frequency bandwidth capability of the terminal.

According to this embodiment, the first threshold is determined based on the first frequency band, synchronization signal blocks corresponding to different frequency bands in the plurality of frequency bands are of different frequency domain widths, and the different frequency bands in the plurality of frequency bands correspond to different first thresholds.

According to this embodiment, the first threshold corresponding to the first frequency band is greater than or equal to a frequency domain width of a synchronization signal block corresponding to the first frequency band.

According to this embodiment, the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds.

According to this embodiment, the first threshold corresponding to the first frequency band is greater than or equal to a frequency domain width of a synchronization signal block corresponding to the first frequency band.

According to this embodiment, the bandwidth capability information of the first frequency band is used to indicate a downlink bandwidth capability or an uplink bandwidth capability of the terminal in the first frequency band.

According to this embodiment, the bandwidth capability information of the first frequency band is used to indicate a downlink bandwidth capability of the terminal in the first frequency band; the transceiver unit 610 receives a downlink signal on the allocated resource; the transceiver unit 610 further receives second bandwidth capability information that is of the first frequency band in the plurality of frequency bands and that is reported by the terminal, where the second bandwidth capability information is used to indicate an uplink bandwidth capability of the terminal in the first frequency band, the uplink bandwidth capability in the first frequency band is not less than a second threshold, and the second threshold is determined based on the maximum bandwidth capability of the terminal, the first frequency band, or the subcarrier spacing of the first frequency band; and the transceiver unit 610 further sends an uplink signal on a resource allocated based on the second bandwidth capability information.

According to this embodiment, the second threshold is less than or equal to the first threshold.

According to this embodiment, a difference between the first threshold and second threshold varies with a frequency band in the plurality of frequency bands.

For operations and functions of the units of the apparatus 600, refer to the method embodiment on a base station side corresponding to FIG. 2. To avoid repetition, details are not described herein again.

It should be understood that division of the units in the foregoing signal transmission apparatus is merely logical function division. During actual implementation, all or some of the units may be integrated into a physical entity, or may be physically separated. In addition, the units may be all implemented in a form of software invoked by a processing element, or may be all implemented in a form of hardware; or some units may be implemented in a form of software invoked by a processing element, and some units may be implemented in a form of hardware. For example, the reporting unit may be a separately disposed processing element, or may be integrated into the signal transmission apparatus. For example, the reporting unit is implemented in a specific chip of the RAN node or the terminal. In addition, the reporting unit may be alternatively stored in the signal transmission apparatus in a form of a program, for example, stored in a memory of the RAN node or the terminal; and is invoked by a specific processing element of the signal transmission apparatus, for example, the RAN node or the terminal, to perform a function of the unit. Implementation of another unit is similar to this implementation. In addition, all or some of the units may be integrated together, or may be implemented independently. The processing element herein may be an integrated circuit and has a signal processing capability. In an implementation process, steps in the foregoing methods or the foregoing units may be implemented by using a hardware integrated logic circuit in the processing element, or by using an instruction in a form of software. In addition, the transceiver unit is a receiving and sending control unit, and may receive or transmit a signal by using the signal transmission apparatus such as an antenna and a radio frequency apparatus of the RAN node or the terminal.

For example, the units may be one or more integrated circuits configured to implement the foregoing method, for example, one or more application-specific integrated circuits (Application Specific Integrated Circuit, ASIC), or one or more microprocessors (digital signal processor, DSP), or one or more field programmable gate arrays (Field Programmable Gate Array, FPGA). For another example, when a specific unit above is implemented in a form of a program scheduled by a processing element, the processing element may be a general-purpose processor, for example, a central processing unit (Central Processing Unit, CPU) or another processor that can invoke the program. For another example, the units may be integrated together and implemented in a form of a system-on-a-chip (system-on-a-chip, SOC).

Figure 7:
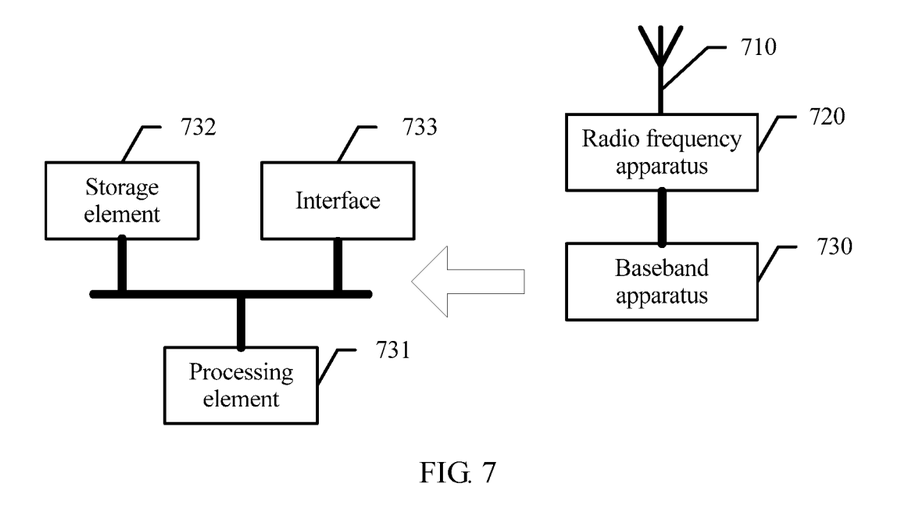
FIG. 7 is a schematic structural diagram of a radio access network node according to one embodiment.

FIG. 7 is a schematic structural diagram of a RAN node according to one embodiment. In this embodiment, an example in which the RAN node is a base station is used for description. As shown in FIG. 7, the base station includes an antenna 710, a radio frequency apparatus 720, and a baseband apparatus 730. The antenna 710 is connected to the radio frequency apparatus 720. In an uplink direction, the radio frequency apparatus 720 receives, by using the antenna 710, information sent by a terminal; and sends, to the baseband apparatus 730 for processing, the information sent by the terminal. In a downlink direction, the baseband apparatus 730 processes information of the terminal, and sends the information to the radio frequency apparatus 720. The radio frequency apparatus 720 processes the information of the terminal, and then sends the information to the terminal by using the antenna 711. The foregoing signal transmission apparatus may be located in the baseband apparatus 730. In an implementation, the foregoing units are implemented in a form of a program scheduled by a processing element. For example, the baseband apparatus 730 includes a processing element 731 and a storage element 732, and the processing element 731 invokes a program stored in the storage element 732, to perform the method in the foregoing method embodiment. In addition, the baseband apparatus 730 may further include an interface 733, configured to exchange information with the radio frequency apparatus 720. The interface is, for example, a common public radio interface (common public radio interface, CPRI).

In another implementation, the foregoing units may be one or more processing elements configured to implement the foregoing method. These processing elements are disposed on the baseband apparatus 730. The processing element herein may be an integrated circuit, for example, one or more ASICs, one or more DSPs, or one or more FPGAs. These integrated circuits may be integrated together to form a chip.

For example, the foregoing units may be integrated together in a form of a system-on-a-chip (system-on-a-chip, SOC). For example, the baseband apparatus 730 includes the SOC chip, to implement the foregoing method. The processing element 731 and the storage element 732 may be integrated into the chip, and the processing element 731 invokes the program stored in the storage element 732, to implement the foregoing method or functions of the foregoing units. Alternatively, at least one integrated circuit may be integrated into the chip to implement the foregoing method or functions of the foregoing units. Alternatively, with reference to the foregoing implementations, functions of some units are implemented in a form of a program invoked by a processing element, and functions of some units are implemented in a form of an integrated circuit.

In any case, the foregoing signal transmission apparatus includes at least one processing element and a storage element. The at least one processing element is configured to perform the method provided in the foregoing method embodiment. The processing element may perform some or all of the steps in the foregoing method embodiment in a first manner of executing the program stored in the storage element, or in a second manner of combining an integrated logic circuit of hardware in the processing element with an instruction. Certainly, the method provided in the foregoing method embodiment may be alternatively performed by combining the first manner with the second manner.

As described above, the processing element herein may be a general-purpose processor, for example, a central processing unit (Central Processing Unit, CPU), or may be one or more integrated circuits configured to implement the foregoing method, for example, one or more application-specific integrated circuits (Application Specific Integrated Circuit, ASIC), or one or more microprocessors (digital signal processor, DSP), or one or more field programmable gate arrays (Field Programmable Gate Array, FPGA).

The storage element may be a memory, or may be a general term of a plurality of storage elements.

Figure 8:
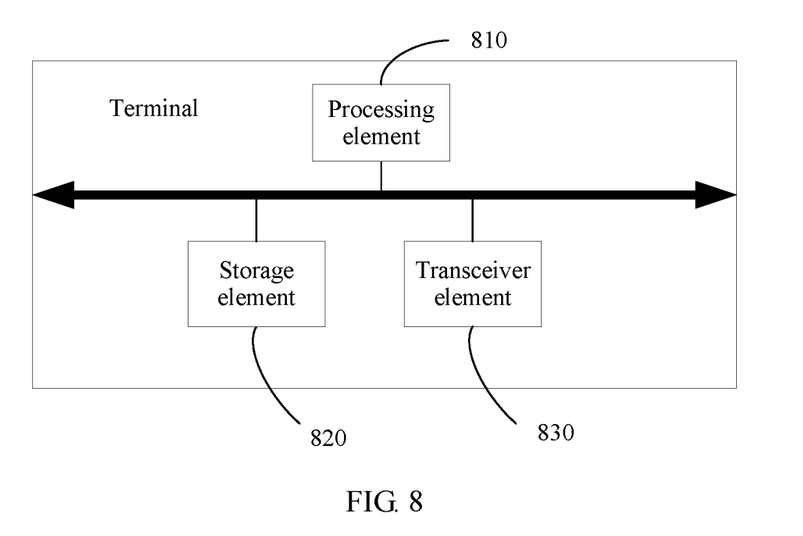
FIG. 8 is a schematic structural diagram of a terminal according to one embodiment.

FIG. 8 is a schematic structural diagram of a terminal according to one embodiment. As shown in FIG. 1, the terminal includes a processing element 810, a storage element 820, and a transceiver element 830. The transceiver element 830 may be connected to an antenna. In a downlink direction, the transceiver element 830 receives, by using the antenna, information sent by a base station, and sends the information to the processing element 810 for processing. In an uplink direction, the processing element 810 processes data of the terminal, and sends the data to the base station by using the transceiver element 830.

The storage element 820 is configured to store a program for implementing the foregoing method embodiment. The processing element 810 invokes the program to perform operations in the foregoing method embodiment, to implement the units shown in FIG. 5 and FIG. 6.

In another implementation, the foregoing units may be one or more processing elements configured to implement the foregoing method. These processing elements are disposed on a circuit board of the terminal. The processing element herein may be an integrated circuit, for example, one or more ASICs, one or more DSPs, or one or more FPGAs. These integrated circuits may be integrated together to form a chip.

For example, the foregoing units may be integrated together in a form of a system-on-a-chip (system-on-a-chip, SOC). For example, the terminal includes the SOC chip, to implement the foregoing method. The processing element 810 and the storage element 820 may be integrated into the chip, and the processing element 810 invokes the program stored in the storage element 820, to implement the foregoing method or functions of the foregoing units. Alternatively, at least one integrated circuit may be integrated into the chip to implement the foregoing method or functions of the foregoing units. Alternatively, with reference to the foregoing implementations, functions of some units are implemented in a form of a program invoked by a processing element, and functions of some units are implemented in a form of an integrated circuit.

Regardless of a manner, in conclusion, the foregoing signal transmission apparatus includes at least one processing element and a storage element. The at least one processing element is configured to perform the method provided in the foregoing method embodiment. The processing element may perform some or all of the steps in the foregoing method embodiment in a first manner of executing the program stored in the storage element, or in a second manner of combining an integrated logic circuit of hardware in the processing element with an instruction. Certainly, the method provided in the foregoing method embodiment may be alternatively performed by combining the first manner with the second manner.

As described above, the processing element herein may be a general-purpose processing element, for example, a central processing unit (Central Processing Unit, CPU), or may be one or more integrated circuits configured to implement the foregoing method, for example, one or more application-specific integrated circuits (Application Specific Integrated Circuit, ASIC), or one or more microprocessors (digital signal processor, DSP), or one or more field programmable gate arrays (Field Programmable Gate Array, FPGA).

The storage element may be a memory, or may be a general term of a plurality of storage elements.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the various embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the various embodiments. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, applied to a multi-band communications system, wherein the method comprises:
reporting, by a terminal, bandwidth capability information of a first frequency band in a plurality of frequency bands to a radio access network node, wherein an operating band of the terminal comprises the first frequency band, the bandwidth capability information of the first frequency band indicating a bandwidth capability of the terminal in the first frequency band, wherein the bandwidth capability in the first frequency band is not less than a first threshold, and the first threshold is determined based on a maximum bandwidth capability of the terminal, the first frequency band, or a subcarrier spacing of the first frequency band; and
sending or receiving, by the terminal, a signal on a resource allocated by the radio access network node based on the bandwidth capability information, wherein the bandwidth capability information of the first frequency band is used to indicate a downlink bandwidth capability or an uplink bandwidth capability of the terminal in the first frequency band.

2. The method according to claim 1, wherein the first threshold is determined based on the maximum bandwidth capability of the terminal, the maximum bandwidth capability being a smaller value of a radio frequency bandwidth capability and a baseband bandwidth capability of the terminal.

3. The method according to claim 2, wherein the baseband bandwidth capability is a product of the subcarrier spacing of the first frequency band and a maximum quantity of Fast Fourier Transform (FFT) points used by the terminal.

4. The method according to claim 3, wherein the first threshold is less than or equal to a smaller value of the product and the radio frequency bandwidth capability of the terminal.

5. The method according to claim 1, wherein the first threshold is determined based on the first frequency band, synchronization signal blocks corresponding to different frequency bands in the plurality of frequency bands are of different frequency domain widths, and the different frequency bands in the plurality of frequency bands correspond to different first thresholds.

6. The method according to claim 5, wherein the first threshold corresponding to the first frequency band is greater than or equal to a frequency domain width of a synchronization signal block corresponding to the first frequency band.

7. The method according to claim 1, wherein the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds.

8. The method according to claim 7, wherein the first threshold corresponding to the first frequency band is greater than or equal to a frequency domain width of a synchronization signal block corresponding to the first frequency band.

9. The method according to claim 1, wherein
the bandwidth capability information of the first frequency band indicates the downlink bandwidth capability of the terminal in the first frequency band, and
the sending or receiving, by the terminal, a signal on a resource allocated by the radio access network node based on the bandwidth capability information comprises:
receiving, by the terminal, a downlink signal on the resource allocated by the radio access network node based on the bandwidth capability information; and
the method further comprises:
reporting, by the terminal, second bandwidth capability information of the first frequency band in the plurality of frequency bands to the radio access network node, wherein the second bandwidth capability information indicates the uplink bandwidth capability of the terminal in the first frequency band, the uplink bandwidth capability in the first frequency band being not less than a second threshold, and the second threshold being determined based on the maximum bandwidth capability of the terminal, the first frequency band, or the subcarrier spacing of the first frequency band; and
sending, by the terminal, an uplink signal on a resource allocated by the radio access network node based on the second bandwidth capability information.

10. The method according to claim 9, wherein the second threshold is less than or equal to the first threshold.

11. The method according to claim 9, wherein a difference between the first threshold and second threshold varies with a frequency band in the plurality of frequency bands.

12. A signal transmission method, applied to a multi-band communications system, wherein the method comprises:
receiving, by a radio access network node, bandwidth capability information regarding a first frequency band in a plurality of frequency bands reported by a terminal, wherein an operating band of the terminal comprises the first frequency band, and the bandwidth capability information regarding the first frequency band indicates a bandwidth capability of the terminal in the first frequency band, the bandwidth capability in the first frequency band being not less than a first threshold, and the first threshold being determined based on a maximum bandwidth capability of the terminal, the first frequency band, or a subcarrier spacing of the first frequency band;
allocating, by the radio access network node, a resource based on the bandwidth capability information; and
sending or receiving, by the radio access network node, a signal on the allocated resource,
wherein the bandwidth capability information of the first frequency band is used to indicate a downlink bandwidth capability or an uplink bandwidth capability of the terminal in the first frequency band.

13. The method according to claim 12, wherein the first threshold is determined based on the maximum bandwidth capability of the terminal, and the maximum bandwidth capability is a smaller value of a radio frequency bandwidth capability and a baseband bandwidth capability of the terminal.

14. The method according to claim 13, wherein the baseband bandwidth capability is a product of the subcarrier spacing of the first frequency band and a maximum quantity of FFT points used by the terminal.

15. The method according to claim 14, wherein the first threshold is less than or equal to a smaller value of the product and the radio frequency bandwidth capability of the terminal.

16. The method according to claim 12, wherein the first threshold is determined based on the first frequency band, synchronization signal blocks corresponding to different frequency bands in the plurality of frequency bands are of different frequency domain widths, and the different frequency bands in the plurality of frequency bands correspond to different first thresholds.

17. The method according to claim 16, wherein the first threshold corresponding to the first frequency band is greater than or equal to a frequency domain width of a synchronization signal block corresponding to the first frequency band.

18. The method according to claim 12, wherein the first threshold is determined based on the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds.

19. The method according to claim 18, wherein the first threshold corresponding to the first frequency band is greater than or equal to a frequency domain width of a synchronization signal block corresponding to the first frequency band.

20. A signal transmission method, applied to a multi-band communications system, wherein the method comprises:
reporting, by a terminal, bandwidth capability information of a first frequency band in a plurality of frequency bands to a radio access network node, wherein an operating band of the terminal comprises the first frequency band, the bandwidth capability information of the first frequency band indicating a bandwidth capability of the terminal in the first frequency band, wherein the bandwidth capability in the first frequency band is not less than a first threshold, and the first threshold is determined based on a maximum bandwidth capability of the terminal, the first frequency band, or a subcarrier spacing of the first frequency band; and
sending or receiving, by the terminal, a signal on a resource allocated by the radio access network node based on the bandwidth capability information,
wherein the first threshold is determined based on
(a) the maximum bandwidth capability of the terminal, the maximum bandwidth capability being a smaller value of a radio frequency bandwidth capability and a baseband bandwidth capability of the terminal, or
(b) the first frequency band, synchronization signal blocks corresponding to different frequency bands in the plurality of frequency bands are of different frequency domain widths, and the different frequency bands in the plurality of frequency bands correspond to different first thresholds, or
(c) the subcarrier spacing of the first frequency band, synchronization signal blocks corresponding to different subcarrier spacings of the plurality of frequency bands are of different frequency domain widths, and the different subcarrier spacings of the plurality of frequency bands correspond to different first thresholds.

* * * * *